United States Patent [19]

Buchs

[11] Patent Number: 5,270,062
[45] Date of Patent: Dec. 14, 1993

[54] RUMINANT ANIMAL FEED INCLUDING COTTONSEED

[76] Inventor: Gary D. Buchs, 6659 A Rd., Valmeyer, Ill. 62295

[21] Appl. No.: 861,928

[22] Filed: Apr. 1, 1992

[51] Int. Cl.$^5$ .................................................. A23K 1/00
[52] U.S. Cl. ........................................ 426/72; 426/74; 426/516; 426/520; 426/630; 426/634; 426/641; 426/643; 426/646; 426/647; 426/807
[58] Field of Search ............... 426/516, 520, 2, 72, 426/74, 623, 630, 634, 807, 636, 641, 643, 646, 647

[56] References Cited

U.S. PATENT DOCUMENTS

| | | | |
|---|---|---|---|
| Re. 24,261 | 12/1956 | Martin | 426/623 |
| Re. 31,763 | 12/1984 | Skoch et al. | 426/658 |
| 344,275 | 6/1886 | Jacobs | 426/627 |
| 1,627,921 | 5/1927 | Miner et al. | 426/636 |
| 1,685,004 | 9/1928 | Mislin | 426/53 |
| 1,723,210 | 8/1929 | Rumsey | 426/630 |
| 2,168,532 | 8/1939 | McMath | 426/542 |
| 2,738,274 | 3/1956 | Le Mense | 426/30 |
| 2,873,190 | 2/1959 | King | 426/630 |
| 3,084,046 | 4/1963 | Johnson et al. | 426/630 |
| 3,268,336 | 8/1966 | Hale et al. | 426/284 |
| 3,700,459 | 10/1972 | Riley | 426/2 |
| 3,745,017 | 7/1973 | Queal | 426/623 |
| 3,870,798 | 3/1975 | Hruby | 426/53 |
| 3,903,307 | 9/1975 | Kimura | 426/53 |
| 3,904,768 | 9/1975 | Hruby | 426/464 |
| 3,940,493 | 2/1976 | Fox | 426/69 |
| 4,211,163 | 7/1980 | Brown | 426/516 |
| 4,323,584 | 4/1982 | Saldien | 426/807 |
| 4,596,712 | 6/1986 | Beck et al. | 426/54 |
| 4,735,808 | 4/1988 | Scaglione | 426/623 |
| 4,747,979 | 5/1988 | Gimber et al. | 426/630 |
| 4,794,011 | 12/1988 | Schumacher | 426/448 |
| 4,826,694 | 5/1989 | McAskie | 426/74 |
| 4,853,233 | 8/1989 | McAskie | 426/271 |
| 4,904,486 | 2/1990 | Donovan et al. | 426/69 |
| 4,957,769 | 9/1990 | Theuninck et al. | 426/74 |
| 4,973,490 | 11/1990 | Holmes | 426/630 |
| 4,996,065 | 2/1991 | Vande Walle | 426/807 |
| 4,997,488 | 3/1991 | Gould et al. | 426/258 |
| 5,045,339 | 9/1991 | Ducharme | 426/641 |

*Primary Examiner*—R. B. Penland
*Attorney, Agent, or Firm*—Litman, McMahon & Brown

[57] ABSTRACT

A ruminant animal feed comprising whole linty cottonseed and preferably soybeans. The soybeans may be replaced by other oil bearing grains and additional nutrients may be added to the feed. The feed includes the lint of the cottonseed for providing fiber to the animals and has a reduced gossypol content as compared to whole raw cottonseed. A process utilizing an auger extruder is used to work the mixture of cottonseed and soybeans to heat the mixture and thereby cook it without charring the mixture. Subsequent to cooking the mixture is extruded and cooled for forming a meal that is provided to the animals for feed.

18 Claims, 1 Drawing Sheet

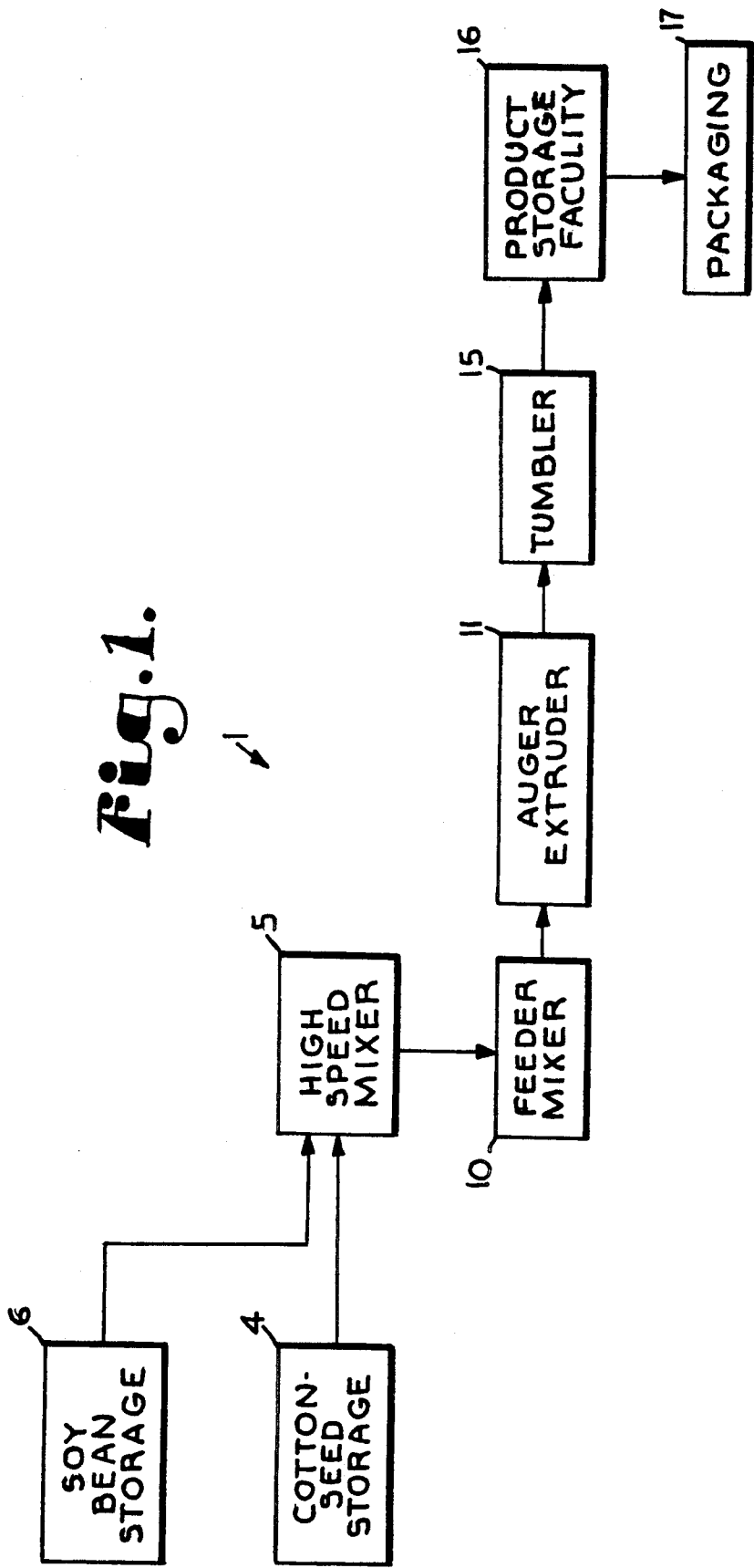

RUMINANT ANIMAL FEED INCLUDING COTTONSEED

BACKGROUND OF THE INVENTION

The present invention is directed to an animal feed, especially suited for ruminant animals. The feed comprises whole linty cottonseed having a reduced toxic gossypol content and includes other edible foodstuffs, especially soybeans.

Cottonseed is a by-product of the cotton producing industry which has a strong potential as a source of food for various animals, especially dairy and beef producing cattle and related ruminant type animals having multiple stomachs wherein food is processed. However, cottonseed has numerous processing problems associated therewith; including that whole cottonseed is very difficult to grind into a usable meal because it tends to clump and bunches and is very difficult to mix with other grains. Conventionally, delinted cottonseed is often initially processed by compression or the like to remove oils therefrom. Such processing produces a cottonseed meal and there have been numerous prior art processes and products which have attempted to use this meal as a feed supplement for livestock or the like. While cottonseed having various oil compositions may be useable in the present invention, it is preferred that the cottonseed be whole and have the complete hull or linty shell thereof Such whole cottonseed results from the separation of the seed from the remainder of the cotton plant during harvest.

The hull or linty shell of the cottonseed is beneficial to cattle because it is a good source of fiber, but the linty fibers tend to make the cottonseed less palatable to cattle. If the whole cottonseed is fed directly to the cattle without removal of the lint or hull, the taste and texture of the feed are such that cattle either will not eat the feed or will eat other feeds preferentially and leave the cottonseed.

Furthermore, the lint of the cottonseed makes the cottonseed relatively hard to process by conventional methods to break down the seed and make it more palatable. This is because the lint creates substantial friction and tends to plug, pack bridge or otherwise interfere with operation of the equipment or it causes over heating of the cottonseed within the equipment which chars the lint thereby reducing the beneficial fiber content of the lint which in turn transfers to the resulting product a charred taste that is likewise unpalatable to the animals eating it. It is also noted that the oil in the whole cottonseed provides an additional source of energy to the animals eating it. Consequently, it is desirable to produce a feed that will utilize the fiber and other nutrient components of the whole cottonseed, yet will make the cottonseed more palatable to the animals.

A second problem associated with cottonseed is that it includes a yellow pigment called gossypol that has the general chemical formula of $C_{30}H_{30}O_8$ and which is a toxin to many types of animals. Fortunately, cattle and other ruminant type animals are comparatively less susceptible to the gossypol toxin, which reduces the oxygen carrying capacity of the blood, than are non ruminant type animals. Nevertheless, even when feeding ruminant animals, it is usually desirable to reduce the active gossypol content of cottonseed. Actually there are a number of different forms of gossypol which are closely related and which are all toxins in their active forms. Gossypol does not appear to be an active toxin unless it is free, as opposed to bound to other components of its carrier. Therefore, it is desirable to either bind or chemically alter as much of the gossypol as possible so that it is denatured or detoxified and is no longer active as a toxin and such that the gossypol in the form of an active toxin is significantly removed from the composition.

For best utilization of a feed, especially a grain or seed, it is often desirable for the feed to be cooked or mechanically worked to break down or crush cell walls associated with the feed to make the feed more digestible to the animals eating it. The breakdown of the cell wall especially makes oils and proteins within the cells more available to absorption within the gastrointestinal tract of the animals. However, it is also necessary to not overheat the cottonseed during the cooking process which may destroy important components or may char the product and destroy fiber. It is also desirable to provide what is termed by-pass protein that is not substantially degraded in the first two stomachs of the ruminants (in a degraded form the protein is no longer available for use by the animal as a protein), but rather is made available for absorption in the later stomachs which makes the bypass protein more available to the animal and cause dairy cows to comparatively increase milk production. Cooking tends to convert certain proteins to by-pass type proteins. It is also desirable to sterilize the resulting product by cooking and cooking makes the resultant product easier to convey and to mix with other grains. It is also desirable to produce a feed composition which incorporates other types of grains and feeds, especially soybeans, and which can be further utilized as a base for the addition for the additional grains, minerals or other nutrients.

SUMMARY OF THE INVENTION

A process is provided for a feed, especially for cattle and other ruminant type animals. The process includes the mixing together of cottonseed with other feed stocks and nutrients to produce a palatable and non toxic source of the components thereof Preferred feed stocks are oil containing grains, especially soybeans. A particularly suitable mixture of the components has been found to be equal parts by weight of raw whole linty or "fuzzy" cottonseed and raw whole soybeans. Preferably the cottonseed has not been partially stripped of oil contained therein nor partially hulled or delinted. After the cottonseed and soybeans are mixed thoroughly, they are conveyed into work means for substantially working the mixture, preferably an extruder.

Within the extruder the mixture is compressed and substantially worked by such as an auger within a casing or a piston within a cylinder which substantially increases the temperature and pressure of the mixture. This temperature and pressure increase within the mixture causes cellular walls to break down and components such as oils and proteins to be released from the cottonseed and soybeans. Effectively the high temperature causes the mixture to cook and the cell breakdown is indicative of this cooking. Care is taken to ensure that the temperature is maintained within certain limits to prevent charring of the mixture and especially of the lint which makes the mixture less palatable to cattle.

The mixture is fed to the extruder, which is preferably a multi auger extruder at a rate of about 20 to 25 pounds per minute. The mixture is driven through the extruder by the augers therein under pressure of preferably about 400 pounds and a temperature between 240° and 330° F. The mixture is extruded after being worked and cooking from the extruder at the same rate and preferably at an exit temperature of about 320° F. At the outlet of the extruder, the mixture is extruded as a hot, semi-liquid product which is then blown into a tumbling bin where the product mixes with air and is cooled and dried. The oil of the product, which has wetted the surface of the mixture within the extruder and which helps allow the mixture to be urged through the extruder, is generally reabsorbed by the resulting product upon cooling. The product is thereafter a somewhat oily meal having a crunchy consistency. More particularly, the final product is a palatable, cooked, coarsely ground meal that is relatively high in usable lint fiber, relatively low in free gossypol content and not charred or burnt. The meal is bagged and utilized as a feed product for ruminant animals, especially dairy cattle.

OBJECTIONS OF THE INVENTION

Therefore, the objects of the present invention are: to produce a feed product, especially for ruminant animals, including cottonseed; to produce such a product wherein the cottonseed includes whole linty raw seed that has not been previously deoiled or delinted; to produce such a product wherein lint from the seed is incorporated into the product and not otherwise removed or charred; to produce such a product wherein the gossypol toxin concentration of the product is substantially reduced as compared to raw cottonseed; to produce such a product wherein the cottonseed is combinable with other grains and foodstuffs, especially soybeans, to produce a palatable product for ruminant animals; to provide a process for the production of such a product wherein the oil of the components of the product, especially cottonseed, reduces friction caused by cottonseed lint such that the product can be extruded; to provide such a method wherein the product is worked, especially by an auger or piston extruder or the like, so as to produce a cooked mixture due to the heat created by the working and pressure due to compression; to provide such a process wherein the product is sufficiently cooked so as to provide a palatable feed to ruminant animals, especially cattle, yet is not charred or burned; to provide such a product that is sterilized after being cooked; to provide such a product which is relatively easy to manufacture, allows full utilization of the entire components thereof as a feed source so as to provide nutrition and fiber to the animals eating the product, is relatively inexpensive to produce, and is especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a block diagram illustrating the process of the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference No. 1 generally designates a process for the production of an animal feed in accordance with the present invention which is illustrated in the block diagram shown in FIG. 1.

According to the present embodiment of the invention, whole, raw cottonseed is withdrawn from storage 4 and conveyed to a first mixer 5 along with whole, raw soybeans withdrawn from soybean storage 6. Although it is foreseen that certain modified cottonseed could be used in conjunction with the present invention, it is preferred that the cottonseed not have been previously processed to remove cottonseed oil or the external fibrous lint therefrom. As will be discussed later, it is preferred that the lint be present and not charred or burnt, so as to provide fiber within the feed to the animals eating the feed. Likewise, the oil is utilized to somewhat lubricate the system and prevent plugging or jamming of downstream equipment during the processing described below while proving a valuable source of energy to the animals eating the feed. The soybeans are likewise preferably whole and not previously modified by processing to remove oil or the like. Preferably, the soybeans are used in equal amounts by weight with the cottonseed. However, it is foreseen that wider ranges of usage of various components to one another are functional within the invention and that a ratio within the range of 30% to 70% by weight of cottonseed to a remainder of soybean is within a highly useful range, while a range of from 1% to 100% by weight of cottonseed to a remainder of soybean would be usable within the scope of the invention. However, when the higher percentages of cottonseed are utilized, the seed must be first soaked in water or otherwise treated to reduce friction during working of the seed as discussed below.

It is also foreseen that since the major goal of the present invention is to provide whole cottonseed to animals for feed, that other suitable components could replace the soybeans within the scope of the invention. Especially useful are grains having an oil content such as canola, sunflower seeds or the like. Further it is foreseen additional components may be added to the product such as meat meal, bone meal, blood meal, fish meal, soybean meal, corn, milo, wheat, barley, rice, oats and cereal grains, vitamins and minerals.

The first mixer 5 preferably includes a holding cylinder within which rotates a series of mixing paddles. The purpose of the first mixer 5 is to loosely mix the cottonseed and soybeans therein so as to produce a loose somewhat uniform mixture thereof. The mixture is then conveyed by gravity into a feeder mixer 10 which functions as a feeding mechanism for an extruder 11. The feeder mixer 10 is preferably a high speed mixer and is an integrated component with the extruder 11. A suitable mixer 10 is for example, a Prater twin screw mixer having two adjacent aligned augers. A suitable structure for meeting the requirements of the extruder 11 is an Insta-Pro dry extruder Model 2000 produced by Insta-Pro of 10301 Dennis Avenue, Des Moines, Iowa. Preferably the mixer 10 includes an auger for both mixing the mixture and urging the mixture into the extruder 11. A typical extruder 11 may incorporate multiple internal augers within a chamber that tightly surrounds the augers and which includes steam locks formed by washer type seals, positioned between auger sections to ensure that the mixture must be highly worked by the augers within the extruder 11 as it passes therethrough.

As the mixture is urged into the extruder 11 the mixture is compressed and worked extensively by the continuous rotation of the auger assemblies within the extruder 11. The result is that the mixture is compressed and substantially pressurized. For example, an extruder of the type discussed above having augers at a rotational speed of approximately 600 rotations per minute and utilizing the mixture discussed above, produces an interior operating pressure of approximately 400 pounds per square inch. This compression along with this substantial amount of work done upon the mixture by the rotation of the auger assemblies, substantially increases the temperature of the mixture, such that the mixture "cooks" during passage through the extruder. As is used herein cooking is heating to destroy cellular walls of components of the mixture thereby releasing oil and proteins in conjunction with the mechanical working or crushing of the extruder without charring or burning the mixture.

The resulting release of oil within the mixture helps to lubricant the passage of the mixture through the extruder 11. It is desirable for the mixture to pass through the extruder 11 in such a manner that it does not char or exceed certain temperatures that might cause an undesirable taste within the feed to the animals subsequently eating the feed. Preferably the temperature within the extruder 11 is maintained within a range of 280° to 320° F. However, temperatures somewhat on either side of this range, especially in the range of from 240° F. to 330° F., are still considered functional for certain embodiments of the present invention.

The mixture is extruded from the extruder 11 through a 3/8 inch nozzle in a cone shaped bullet or nose cone of the extruder preferably at about 320° as a cooked grain product that is semi-liquid in composition. Preferably the nose cone of the extruder 11 is attached to the remainder thereof by a shear pin to allow the nose cone to separate therefrom if back pressure within the extruder 11 becomes too great due to plugging. At the outlet of the extruder 11 the exiting mixture is blown into a tumbling bin or dryer 15 where the mixture is mixed with ambient air so as to be cooled. The cooled mixture in the tumbler 15 has the appearance of an oily meal that is crunchy in consistency. The oil that had been urged from the mixture while passing through the extruder 11 is substantially reabsorbed by the meal so as to have a "dried" appearance. This cooled meal is the final product of the process 1.

Subsequently, the product is transferred from the tumbler 15 to a product storage facility 16 and is later packaged at a packaging station 17 for transfer to users of the feed. The product in the storage facility 16 can be alternatively mixed with other grains such as soybean meal, corn meal, crushed corn, wheat, or the like to make a modified product for feeding. Preferably the final product of the process has a substantially reduced free gossypol level as compared to the original mixture entering the extruder 11 and has substantially all of the lint associated with the original cottonseed used in the mixture still within the final product.

The following examples are for purpose of illustration only and are not intended to limit the scope of the claims of the present application.

EXAMPLE 1

A mixture of equal amounts by weight of soybeans and whole, raw cottonseed is formed in accordance with the process described above with reference to FIG. 1. The mixture was processed through the process 1 and in particular through the extruder 11 at a flow rate of 25 pounds per minute, at a pressure of approximately 400 pounds per square inch within the extruder 11 and had a temperature of approximately 320° F. at the exit of the extruder 11. A final product was prepared in accordance with the process 1. The final product had the following composition:

| Crude Protein | 30% |
| --- | --- |
| Fat | 19% |
| Crude Fiber | 11% |
| Moisture | 6.5% |

The cottonseed prior to forming the mixture had a total gossypol content of 1.0% and a free gossypol content of 0.91%. The final product had a total gossypol content of 0.201% and a free gossypol content of 0.021%. It is noted with respect to gossypol that free gossypol is toxic whereas combined gossypol is not considered toxic. Consequently, this data indicate that 95% of the free gossypol was detoxified within the process 1.

EXAMPLE 2

A first feed was produced according the present invention was produced. Equal amounts by weight of whole linty cottonseed were mixed with soybeans and extruded in accordance with Example 1 to produce an intermediate product that was then mixed in an amount of 70% by weight with 10% by weight dried molasses and 20% by weight ground corn to produce the first feed. A second feed was a conventional feed with a majority protein source from soybean meal. The first and second feeds were balanced so that both were substantially equal with respect to net energy for lactation and total protein units per pound.

Twenty four milk producing cows were divided into two groups and fed the first feed or the second feed respectively for 28 days after which the order was reversed. During the period cows were also fed a fixed amount of forage each day with the feeds. Each cow was fed approximately 25 pounds of feed and 25 pounds of forage each day during the period. All cows produced 2.5 more pounds of milk per day and high producing cows from the group produced 3.8 more pounds of milk per day when on the first feed as compared to the second feed. During the period body weight loss for the cows eating the first feed was significantly lowered indicating an improvement in available energy.

It is foreseen that the working means of the present invention may be piston type device wherein the cottonseed and soybean mixture is driven through a cylinder by a ram and extruded through a nozzle. Such a structure provides an advantage to an auger type extruder in that it is easier to clean and to unplug should the mixture become plugged. However, a piston type device may take longer to load. Other types of possible working means include a mill.

It is to be understood that while certain forms of the present invention have been illustrated and described herein, it is not to be limited to the specific forms or arrangement of parts described and shown.

What is claimed and desired to be secured by Letters Patent is as follows:

1. A process for the production of an animal feed comprising the steps of:
   a) forming a mixture of a substantially whole, raw cottonseed with a second whole, raw oil containing grain component;
   b) substantially working said mixture in an extruder at elevated temperature and pressure so that the cellular walls of said cottonseed and said second grain component of said mixture are broken down while utilizing oil from said second grain component as lubricant so said cellular walls are broken down without burning or charring fiberous material; c) extruding the mixture; and
   c) thereafter cooling said mixture so as to form a palatable ruminant feed product therefrom.

2. The process according to claim 1, including the step of:
   a) adding soybeans to said mixture as said second grain component.

3. The process according to claim 1, including the step of:
   a) adding a sufficient amount of cottonseed to said mixture such that said mixture is at least originally 1% cottonseed.

4. The process according to claim 1, including the step of:
   a) adding said cottonseed to said mixture in an amount such that said cottonseed is at least 30% by weight of said mixture.

5. The process according to claim 1, including the step of:
   a) adding said cottonseed to said mixture so that said cottonseed is at least 50% by weight of said mixture.

6. The process according to claim 1, including the step of:
   a) adding whole, raw soybeans in an amount of approximately 50% by weight of said mixture to said mixture as said second grain component with said cottonseed being substantially the remainder of said mixture; and
   b) working said mixture in a multi-stage auger to a temperature within a range between 240° and 320° F. for a sufficient time to cook said mixture and substantially break down cellular walls within said mixture without charring said mixture.

7. A process for the production of a ruminant animal feed comprising the steps of:
   a) forming a mixture of at least 1% by weight of whole raw cottonseed and at least a second component chosen from whole, raw oil bearing grains;
   b) placing said mixture in working means for exerting a substantial amount of work upon said mixture to raise the temperature and pressure of the mixture for sufficient time to substantially break down cellular walls within said cottonseed and said second component;
   c) thereby maintaining said mixture within said working means for a sufficient period of time to cause cooking of said mixture without charring fibrous material of said mixture; and d) removing the resulting mixture from said working means.

8. The process according to claim 7, including the step of
   a) providing whole, raw soybeans as said second component.

9. The process according to claim 8, including the step of:
   a) providing said whole, raw soybeans in an amount sufficient to be approximately 50% by weight of said mixture and providing sufficient cottonseed to be a remainder of said mixture.

10. The process according to claim 7, including the step of:
    a) providing a auger type extruder as said working means; and
    b) operating said extruder under operating conditions such that the temperature of said mixture is maintained within a range of 240° to 320° F. at the exit of said extruder.

11. An animal feed for ruminant animals consisting essentially of:
    a) a coarse meal comprising whole linty cottonseed including cottonseed lint having a substantially reduced gossypol content as compared to raw cottonseed in combination with a second whole, raw oil bearing grain wherein said cottonseed and said second grain are mixed and the cell walls of said cottonseed and grain are substantially broken down and wherein the gossypol content of the cottonseed is substantially reduced without reducing the lint content of said cottonseed.

12. The product according to claim 11, wherein:
    a) said second grain is soybeans.

13. The product according to claim 12, wherein:
    a) said cottonseed is at least 30% by weight of said feed and said soybeans are not more than 70% by weight of said feed.

14. The feed according to claim 12, wherein:
    a) said cottonseed is approximately 50% by weight of said feed and said soybeans are substantially 50% by weight of said feed.

15. The feed according to claim 11, including:
    a) a component chosen from the group consisting essentially of bone meal, meat meal, blood meal, fish meal, soybean meal, vitamins, minerals and mixtures thereof.

16. A cooked and palatable animal feed meal consisting essentially of whole linty cottonseed including substantially the entire lint associated with the cottonseed, said meal has a substantially reduced gossypol content as compared to raw cottonseed with the cellular walls of said cottonseed being broken down and mixed with a second oil bearing grain wherein the gossypol content is reduced without reducing the lint content of said cottonseed.

17. The feed according to claim 16, wherein:
    a) said cottonseed is at least 30% by weight of said feed.

18. The feed according to claim 16, wherein:
    a) said cottonseed is present in said feed in an amount that is approximately 50% of by weight of said feed; and
    b) approximately 50% by weight of said feed is whole, raw soybeans.

* * * * *